April 22, 1924.

A. B. HICKEN 1,491,096

PORTABLE MATERIAL HANDLING MACHINE

Filed May 26, 1922   3 Sheets-Sheet 1

Inventor,
Alfred B. Hicken
By Ira M. Jones.
Attorney.

April 22, 1924.

A. B. HICKEN 1,491,096

PORTABLE MATERIAL HANDLING MACHINE

Filed May 26, 1922 3 Sheets-Sheet 2

Alfred B. Hicken
Ira M. Jones
Attorneys

April 22, 1924.

A. B. HICKEN 1,491,096

PORTABLE MATERIAL HANDLING MACHINE

Filed May 26, 1922   3 Sheets-Sheet 3

Inventor,
Alfred B. Hicken
By Ira M. Jones.
Attorney.

Patented Apr. 22, 1924.

1,491,096

UNITED STATES PATENT OFFICE.

ALFRED B. HICKEN, OF WAUKESHA, WISCONSIN.

PORTABLE MATERIAL-HANDLING MACHINE.

Application filed May 26, 1922. Serial No. 563,870.

*To all whom it may concern:*

Be it known that I, ALFRED B. HICKEN, a citizen of the United States, and resident of Waukesha, in the county of Waukesha and State of Wisconsin, have invented new and useful Improvements in Portable Material-Handling Machines, of which the following is a description, reference being had to the accompanying drawings, which are a part of this specification.

This invention relates to certain new and useful improvements in material handling machines and refers more particularly to a machine for crushing rock and the like to form gravel.

All of the machines now in use for this purpose are extremely costly to operate are incapable of being readily transported from one place to another, and oftentimes require, by reason of their immobility, that they be set up at a point distant from the work pit or material supply. This highly objectionable feature results in great loss, as oftentimes a machine is set up at a pit and, when the work is completed, is permitted to lay idle and deteriorate rather than go to the expense of tearing the machine down and again setting it up at another place of work.

Having the above objections in mind, it is a primary object of my invention to provide a material handling machine of the class described which is readily portable and may be quickly moved from one place of work to another, thus making it possible to operate the machine at one pit and then transport the same to a new one without any expense other than the cost of fuel necessary to operate the machine motor and the time of the operator.

Another objectionable feature to the present type of material handling machine is that, if it is operated in the pit, no means are provided for conveying the material therefrom to wagons or storage bins and, as a result, the machine is most often set up at a distance from the pit and the ungraded and unprepared material carried thereto.

This objectionable feature materially hinders the efficient operation of the machine and, therefore, it is another object of my invention to provide a machine of the class described which is capable of being operated directly in the pit and can be readily advanced to keep close to the work and has a conveyor for carrying the material from the pit to a point remote therefrom, either directly into the wagons for transportation or into a storage bin.

Another object of this invention is to provide a unitary portable machine for crushing gravel which has its own power unit for driving the crushing mechanism and material conveyor and for propelling the machine from one place to another.

It is another object of this invention to provide means whereby any rock of a size too large to pass through the discharge opening of the hopper is separated from the aggregate to thus prevent clogging of the hopper discharge.

Another object of this invention resides in the provision of a chute adjacent the hopper so that the operator may place the pieces too large to pass therethrough in the chute which conveys the pieces to a platform adjacent the crushing mechanism so that the operator may feed them to the crushing mechanism when no other work is passing through to thus eliminate waste of time by keeping the crushing jaws filled at all times.

Another object of this invention resides in the provision of means for removing all clay from the material fed to the crusher to thus prevent damage thereto.

Another highly objectionable feature to the present day type of machines of the class described is that they require a number of attendants at the controls and this invention has for another of its objects to provide a machine so designed and constructed as to require the attention of but a single attendant.

Another object of this invention is to provide a power unit having two independent power take-off shafts, one of which is connected with the material handling mechanism and the other with the propelling wheels of the machine, the last named shaft having a differential therein to permit proper driving of the machine under its own power.

A further object of this invention is to provide an improved drive for a screened drum and a reciprocating feed trough for feeding material thereto from a supply hopper.

A still further object of this invention resides in the provision of a unitary portable machine of the class described which is self-propelled, permits quickness of operation, requires no setting up, permits going directly at the work to be handled and is capable of being readily moved from one pit to another.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which.

Figure 1:
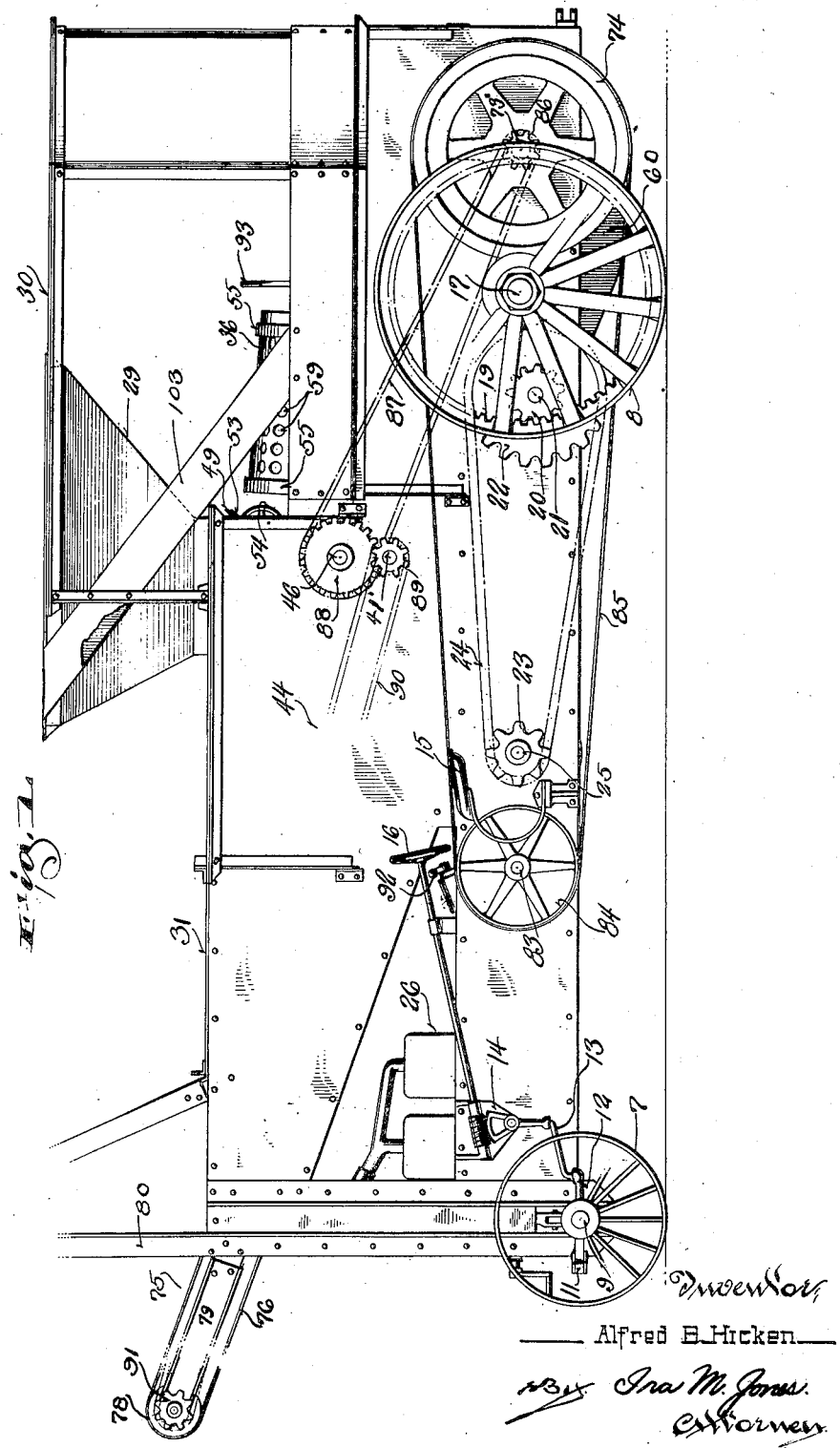
Figure 1 is a side view of a machine constructed in accordance with my invention, the intermediate portion of the material conveyor being broken away and a fragment of the chute leading from the hopper for the extraordinarily large pieces of material being broken away.

Referring now more particularly to the accompanying drawings, in which like numerals designate like parts throughout the several views, the numerals 5 and 6 designate upper and lower longitudinal sills or side beams of a chassis frame supported at its forward end by steering wheels 7 and at its rear end by traction or propelling wheels 8. The front wheels 7 are mounted on spintles 9 pivotally secured to an axle member 10 and connected by a steering rod 11, one of the spintles having a rearwardly projecting arm 12 connected, by a link 13, with a suitable steering gear 14 controlled from a position adjacent the driver's seat 15 by a wheel 16.

The rear propelling wheels are freely, rotatably mounted on the journals 17 of a rear axle 18 secured between the sills 5 and 6. The wheels 8 have internal gears 19 secured thereto adjacent their inner edges with which engage drive pinions 20 carried by shafts 21 journaled in suitable bearings secured to the adjacent sills 6. Each shaft 21 has a sprocket wheel 22 mounted thereon which is connected with a sprocket wheel 23, by a chain 24, the sprocket wheels being carried by the drive shaft 25 of a power unit 26.

Drive shaft 25 includes a differential mechanism of conventional type confined within a casing 27 and is connected, through a suitable transmission (not shown) also confined within casing 27, with unit 26. The power unit is mounted in the forward end of the chassis frame in any desired manner and has its water circulating system connected with a radiator 28 mounted at the front end of the chassis frame. In transporting the machine from one place to another, the operator sits in seat 15 and drives the machine, thus permitting the ready transportation of the machine.

The chassis frame has a super-structure formed of upright and horizontal beams and at its intermediate portion is mounted a hopper 29, the upper end of which is surrounded by strong protecting coverings 30 and 31 which protect the machinery from material which may be dropped outwardly thereof by the shovel or other machine discharging therein. Covering 30 is substantially flush with the top of the hopper and extends over an intermediate platform 32 where the operator most usually sits or stands during the working of the machine.

Hopper 29 has a reciprocating discharge table or trough 33 at its lower end, the sides of which have depending flanges 34 riding on the treads of flanged wheels 35 and the discharge end of said trough is extended into a rotatable foraminous drum 36, to be later described. The hopper side, adjacent drum 36, is provided with an opening 37 in order that the materials may be fed into the drum by trough 33, which is continuously reciprocated during the operation of the machine by a pitman 38.

The inner end of the pitman has an eccentric 40 journaled therein and the outer end thereof is pivotally connected with the intermediate part of a link 41, as at 42, one end of said link being pivotally secured to a fixed transverse beam 43 carried by the sides 44 of the machinery guard casing or housing and the other end thereof is pivotally secured, as at 45, to the end of trough 33 remote from the drum. With this construction, rotation of shaft 41', by reason of its connection with a driven shaft 46 through the medium of gears 47 and 48, will continuously reciprocate the trough and feed the material from hopper 29 to drum 36.

The rate at which the material is discharged from the hopper may be controlled by an adjustable gate 49 mounted in guides 50. The adjustable gate is secured with its inner end positioned at any desired distance from the opposite wall of the hopper by a pinion gear 51 fixed to a shaft 52 and meshing with a gear rack 53 carried by gate 49. Shaft 52 is rotated, to quickly adjust the gate, by a hand wheel 54 secured thereto exteriorly of the hopper.

Drum 36 has an annular track 55 mounted thereon adjacent each end which ride on the tread of flanged wheels 56 to rotatably support the drum. Certain of the wheels 56 are carried by a driven shaft 57 connected with shaft 41' by a gear connection 58, whereby rotation of shaft 57 revolves the drum about its axis. Drum 36 and trough 33 are disposed at an angle with respect to the horizontal and have their discharge ends lower than their other ends. Drum 36 is provided with a plurality of apertures or openings 59 of a size not larger than the maximum size material it is desired to turn out.

Mounted between the side beams of the chassis frame, rearwardly of drum 36 and adjacent its discharge end, is a crushing mechanism whereby all material not passing through the openings of the drum may be reduced to the desired size. The crushing mechanism is mounted between two heavy, side plates 60 mounted between the side beams of the chassis frame and providing a reinforcement thereto in order to properly support the crushing jaws, now about to be described.

Positioned adjacent the discharge end of the drum is a stationary jaw 61 which is mounted upon two transverse shafts 62 and has its lower end braced, to withstand the impact of material forced thereagainst by a movable jaw 63, by a shaft 64 against which the lower end of the stationary jaw rests. The movable jaw has its upper end pivotally supported from a shaft 65 and has its lower end yieldably held in engagement with the end 66 of a pitman 67 by an adjustable rod 68. The inner end of rod 68 is pivotally secured to the lower end of jaw 63 and the outer end thereof passes through an aperture in a transverse brace 69 connecting beams 6, a spring 70 being coiled about the rod between brace 69 and an adjusting nut 71.

Spring 70, at all times urges rod 68 outwardly and consequently resiliently maintains bearing member 72 of the movable jaw in engagement with pitman end 66. The pitman 67 is journaled about an eccentric 73, carried by a shaft 73' journaled in side plates 60 and with its ends projecting therebeyond to mount fly wheels 74.

Extended upwardly and forwardly from a point slightly rearwardly of the discharge end of the crushing jaws 61 and 63, and passing beneath drum 36, is a conveyor 75 in the form of an endless belt 76 having its inner end trained about a guide roller 77 and its outer end trained about a guide roller 78. Roller 78 is supported from the forward end of the machine by a framework 79 carried by standards 80 forming part of the machine super-structure. The upper stretch of the belt is supported against sagging by rollers 81 and that part of the belt within the machine proper is safeguarded and enclosed by sides 44, platform 31 at the top thereof, and bottom 82 which is inclined to provide a space therebeneath for the power unit and transmission.

The various mechanisms herein described receive their drive from a power takeoff shaft 83 on the outer end of which is mounted a pulley 84 connected with one fly wheel 74 by a belt 85, shaft 73', of the fly wheels, having a drive sprocket 86 mounted thereon and connected, by a sprocket chain 87, with a sprocket wheel 88 fixed to shaft 46. The conveyor belt 76 is driven from shaft 41' by a sprocket wheel 89 fixed thereto and connected, by a sprocket chain 90, with a sprocket 91 mounted on the shaft of one of the conveyor end rollers.

The mechanism drive may be rendered inoperative within the transmission by a gear shift lever 92, or the drive of the conveyor drum and reciprocating trough may be rendered inoperative, without disturbing the drive of the movable crushing jaw, by a lever 93 which is operable to engage and disengage gear 48 with gear 47, gear 48 being slidably splined on shaft 46 and connected with the rod 94, of lever 93, by a yoke 95.

In use, my improved machine is moved into the pit and positioned to bring hopper 29 within convenient reach of the excavator and the materials are discharged directly into the hopper, all material falling outwardly thereof striking platforms 30 and 31 to thus prevent injury to the machinery or to the operator. The material is first graded by a coarse screen or perforated partition 96 within hopper 29 so that any rocks of a size larger than openings 97 will be separated from the aggregate. Openings 97 are of a size preferably less than that of the hopper discharge, so that choking of the hopper is prevented. The material passing through the openings 97 of this partition is fed to drum 36 by the reciprocating pan or trough 33, a guard or baffle 98 preventing the material from falling into the drive gear beneath the pan.

Figure 2:
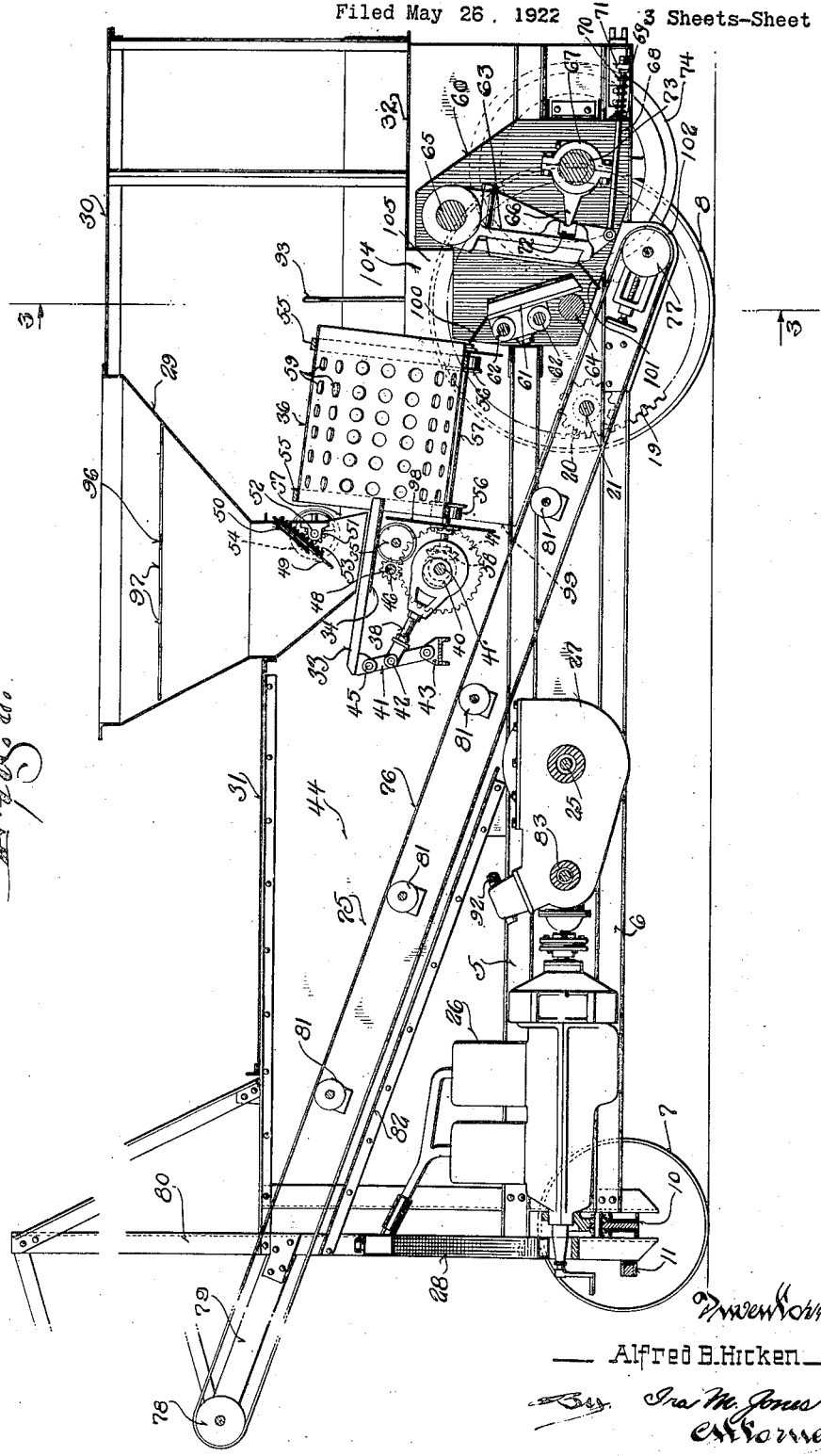
Figure 2 is a view, partly in elevation and partly in longitudinal section, taken through the machine.
Figure 3:
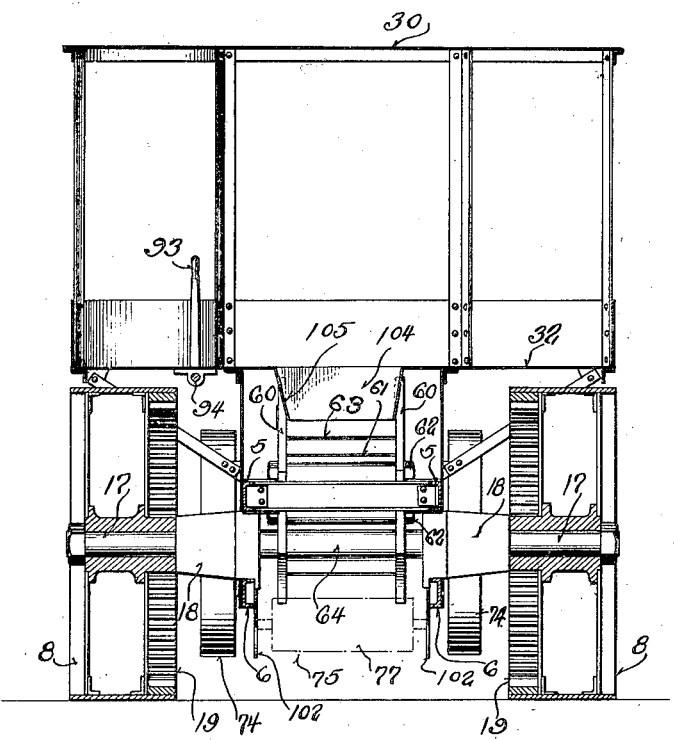
Figure 3 is a view, partly in section and partly in elevation, taken through Figure 2 on the plane of line 3—3.
Figure 4:
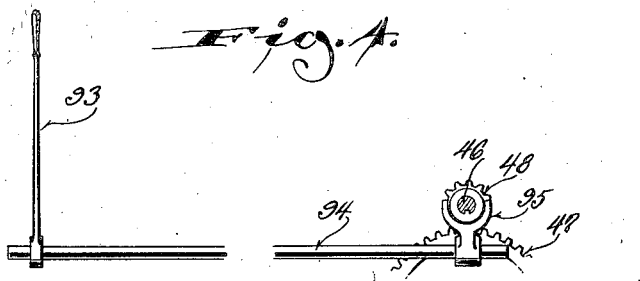
Figure 4 is an enlarged detail view illustrating the means for connecting and disconnecting the screening drum and material conveyor with the source of power.

The drum, being continuously rotated and arranged at an angle, feeds material therethrough and the particles of a size less than the diameter of openings 59 are discharged directly on conveying belt 76, being guided thereto by sides or trough members 99, illustrated by dotted lines in Figure 2. The material not passing through drum 36 is discharged from its lowermost end onto a trough or guide 100 and thence between the crushing jaws which form substantially a V whereby the larger rocks are gradually reduced by the movement of the movable jaw.

As the rocks are reduced to a size less than the width of the space between the lower ends of the jaws, they are discharged onto the conveyor belt, a baffle plate 101 preventing the material from falling rearwardly of the conveyor end, to permit terminating the conveyor adjacent the crushing mechanism. The sides of the lower end of the conveyor, beneath the chassis frame, are protected and the material prevented from sliding from off the conveyor by plates 102, in which the shaft of roller 76 is journaled.

All material of a size too large to pass partition 96 is removed by the operator and placed in a chute 103 which delivers the material to platform 32, which forms a place of storage. When the crushing jaws are idling, the operator places these large pieces of rock through an opening 104 in platform 32 which is provided with depending sides 105 to guide the material to the space between the jaws 61 and 63. In this way, the machine is kept working all the time and is not permitted to stand idle when the hopper has been emptied.

Experience has proven that much damage is caused by the material fed to the crusher being coated with clay, the clay adhering to the crushing jaws and becoming packed and firm and with the machine herein described all clay is removed from the material fed the crusher by the revolving drum and discharged directly on the conveyor.

When it is desired to move the machine from one place to another, the operator sits in seat 15 and drives the machine as he would any type of power vehicle, thus enlarging the scope of work capable of being handled by a single machine, permitting the machine to be readily advanced to be kept close to the work, reducing the cost of operation thereof by reason of requiring the services of but one attendant and in general providing a machine which is an advance over the old type of stationary machine which required dismantling before it would be set up at a new place of work.

What I claim as my invention is:

1. A machine of the class described, comprising a supporting frame, a material receiving hopper mounted thereon and having a material grading element mounted therein, a movable grading element adapted to receive material from said hopper, a material reducing element adapted to receive material from said movable grading element, and additional means for conveying material from said hopper to said reducing element.

2. A machine of the character described, comprising a supporting frame, a material hopper, material grading means adapted to have material fed thereto from the hopper, means in said hopper for preventing material larger than a predetermined size from passing therethrough, material reducing means for receiving material from said grading means, a storage place for said larger material adjacent said material reducing means, means for conveying said larger material to said place of storage, and means whereby said larger materials may be discharged from said place of storage into said material reducing means.

3. A machine of the character described, comprising a supporting frame, a material hopper, material grading means adapted to receive material fed thereto from the hopper, means in said hopper for preventing material larger than a predetermined size from passing therethrough, a storage place for said larger material adjacent said material grading means, a chute extended from the upper portion of said hopper to said place of storage whereby said larger material may be readily removed from the hopper and conveyed to said place of storage, said place of storage having an opening in its bottom adjacent said material grading means.

4. A machine of the character described, comprising a supporting frame, a material hopper, material grading means adapted to receive material fed thereto from the hopper, means in said hopper for preventing material larger than a predetermined size from passing therethrough, material reducing means for receiving material from said grading means, a storage place for said larger material adjacent said material reducing means, means for conveying said larger material to said place of storage, means whereby said larger materials may be discharged from said place of storage into said material reducing means, and guides for directing material passing through said opening into said material reducing means.

5. A machine of the class described, comprising a supporting frame having a material receiving hopper mounted thereon, a grading element positioned directly adjacent the hopper and receiving material therefrom, a material reducing element receiving oversize material from said grading element, and an imperforate elevating element positioned under said grading and reducing elements to receive at different points lengthwise thereon all material discharged by said grading and reducing elements.

6. A machine of the class described, comprising a hopper, a reciprocating trough mounted at the lower end thereof for feeding material therefrom, a grading drum having its receiving end adjacent the discharge end of said hopper and having the discharge end of said trough projected thereinto whereby material is discharged from the trough directly into said drum and a baffle independent of the drum and trough and arranged to prevent accidental falling of the material from said hopper outwardly of the receiving end of said drum.

7. A machine of the character described, comprising a supporting frame, a material hopper, material grading means adapted to have material fed thereto from the hopper and including a grading member and a reducing member, the material from the hopper first passing through the grading member and the material larger than a predetermined size passing from the grading member to the reducing member, a platform on the frame adjacent the reducing member, and means within said hopper for preventing material larger than a predetermined size from passing therethrough, whereby said larger material may be placed on said platform and independently fed to said reducing member.

8. A machine of the class described, comprising a supporting frame having a material receiving hopper mounted thereon, a grading element positioned directly adjacent the hopper and receiving material therefrom, a material reducing element receiving oversize material from said grading element, an imperforate elevating element positioned under said grading and reducing elements to receive at different points lengthwise thereon all material discharged by said grading and reducing elements, and a baffle plate for guiding materials reduced by said reducing element to said elevating element.

9. A machine of the class described, comprising a supporting frame having a material receiving hopper mounted thereon, a grading element receiving material from said hopper, a material reducing element adapted to receive certain material from said grading element, and said reducing element adapted to receive certain material direct from said hopper.

In testimony whereof I affix my signature.

ALFRED B. HICKEN.